H. P. KRAFT.
METHOD OF MAKING TIRE VALVES.
APPLICATION FILED AUG. 27, 1915.
1,359,075.
Patented Nov. 16, 1920.
Fig.1. Fig.2. Fig.3. Fig.4. Fig.5.
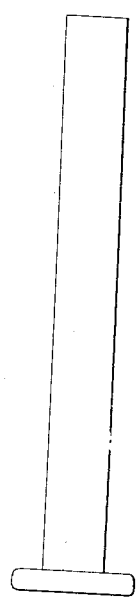 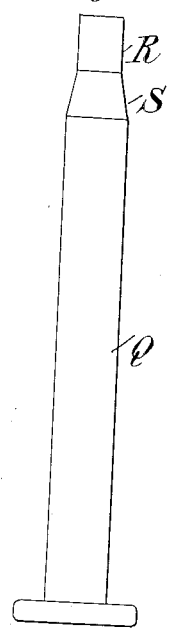 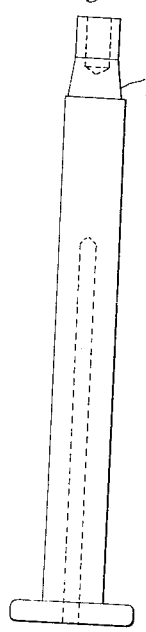 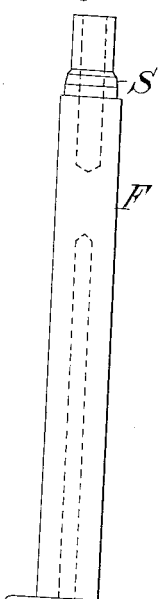 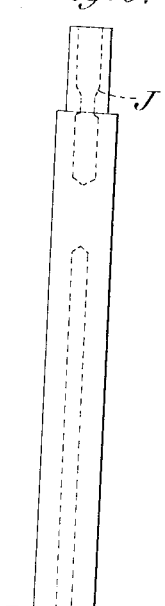
Fig.6. Fig.7. Fig.8. Fig.9. Fig.10.
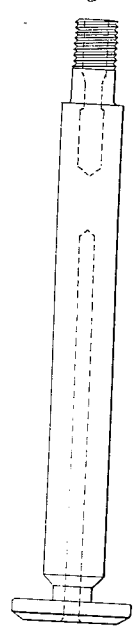 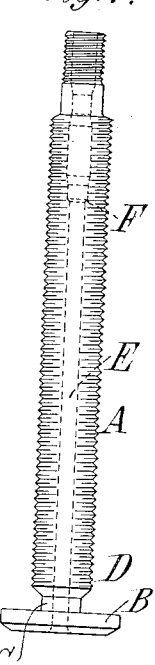 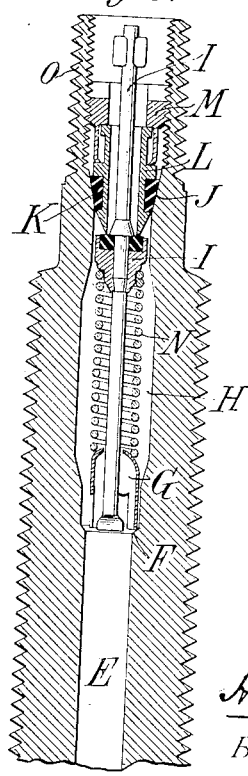 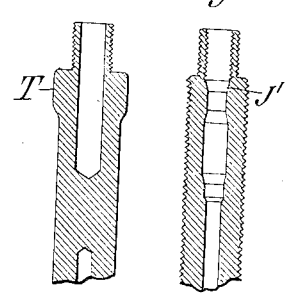
WITNESSES:
René Bruine
Fred White
INVENTOR:
Henry P. Kraft,
By Attorneys,

UNITED STATES PATENT OFFICE.

HENRY P. KRAFT, OF RIDGEWOOD, NEW JERSEY.

METHOD OF MAKING TIRE-VALVES.

1,359,075.  Specification of Letters Patent.  Patented Nov. 16, 1920.

Application filed August 27, 1915. Serial No. 47,684.

*To all whom it may concern:*

Be it known that I, HENRY P. KRAFT, a citizen of the United States of America, residing in Ridgewood, in the county of Bergen and State of New Jersey, have invented certain new and useful Improvements in Methods of Making Tire-Valves, of which the following is a specification.

This invention relates to valves for pneumatic tires and other similar purposes and aims to provide certain improvements therein.

In the tire valves at present in use certain standard dimensions have been reached, some of which are fixed by the practical standardization of the valve holes through the rims and tires of the wheels, and others of which are very desirable to maintain in order to continue the interchangeability of the parts now distributed in large quantities throughout the country. Chief among these parts are the so-called valve insides which are adapted to fit in the valve shell or casing so that renewal of the inside parts is possible at practically any point where automobile supplies are sold. The object of the present invention is to increase the size of the passages through the valve whereby air under pressure may be more easily passed into the tire while retaining the standard measurements and avoiding any alteration which would interfere with the interchangeability of the parts. As at present constructed the standard valve is composed of a circular casing flattened on its side to non-rotatively engage the valve clamps, and being provided at its lower end with a foot adapted to engage the inner side of the tire tube and immediately above such foot with a constriction or neck of less diameter than the body of the valve, into which neck the edges of the tire tube fit. The top of the valve is provided with a nipple arranged to receive the standard cap and provided with an internal screw-thread to receive the standard pump coupling. The interior of the valve is bored with a valve chamber, and a packing seat above the chamber designed to coact with a packing carried by the inside parts to make a tight joint therewith, and below the valve chamber is a second seat adapted to receive the end of the valve spring which is provided with a cup bearing against the seat. The valve chamber is thus located between two seats and it has been found practically impossible to make larger bores throughout due to the restricted diameter of the valve casing. The object of the present invention is to provide a diametrically larger chamber without altering the other fixed proportions of the valve. The invention also includes certain other improvements which will be hereinafter described.

In the drawings,—

Figures 1 to 7 are elevations of the blanks of which the valve casing is formed showing various operations.

Fig. 8 is an enlarged diametrical section of the upper portion of the completed valve.

Figs. 9 and 10 are sectional views illustrating a modification.

Referring first to Figs. 7 and 8 of the drawing, let A designate the standard valve casing provided at its bottom with a foot B which is designed to engage the inner side of the tire tube. Immediately above the foot B is a neck C of reduced diameter forming an annular groove D in which fits the edge of the tire tube. Passing upwardly from the bottom of the valve is a passage E which has been necessarily restricted in size, as the removal of the metal to form the passage weakens the neck C which is the weakest part of the valve casing. The passage E leads upwardly to a shoulder or constriction F which forms a seat for the spring cup or guide G. Above the seat F is a valve chamber H within which works the valve proper I. At the upper part of the valve chamber is a seat J which is designed to engage a packing K carried by a seat member L which is forced downwardly by a screw threaded plug M. The plug M, seat member L, valve proper I, spring N and cup G are connected together by a pin P, which is fixed to the valve, the upper end passing to a point near the top of the valve shell for deflating purposes and the lower end sliding through the cup G and adapted to form a guide for the valve. These various connected parts are what are known in the trade as valve insides or valve plungers, and are distributed in large quantities for the purpose of repair, it being necessary only to replace a defective plunger with a new one in case of leakage through the valve.

The upper part of the valve shell is reduced to form a nipple O which is screw-threaded on its exterior to receive the usual valve cap and on its interior to receive the ordinary pump coupling.

In the valve shown most of the dimensions are fixed or standard, and it is very desirable to maintain these dimensions in order to retain the interchangeability of parts now upon the market. For instance for a certain sized valve designed for certain use the outside dimensions of the casing, the dimensions of the neck, the inside and outside diameters of the nipple O, the diameter of the seat J, and the seat F are practically fixed, as is also the diameter of the bore E at the point where it passes through the neck C. These limitations for practical purposes limit the diameter of the valve chamber to that of the narrowest diameter of the seat J. In Patent No. 1,171,147 granted February 8, 1916, to Maximilian C. Schweinert a valve having an enlarged valve chamber is described and claimed and the present application includes a method of forming such chamber.

According to the present invention the enlargement of the valve chamber H is accomplished by a swaging operation which is adapted to form the seat J. In practising the invention the valve shell is bored from the top down to the commencement of the seat F with a hole of uniform diameter equal to the desired internal diameter of the valve chamber. This bore may be of any dimensions which leaves sufficient metal in the nipple O, but as the internal and external diameters of this nipple are for the purposes of the standard valve fixed, as before stated, the valve chamber H is made of a diameter which is equal to that of the internal diameter of the nipple. Such diameter is sufficient to considerably enlarge the effective passage around the valve I, with the effect that the ingress and egress of air is materially facilitated. It will be noted that in the valve of the construction shown this diameter should be larger than that of the seat J.

In proceeding according to the invention after the drilling of the uniform bore from the top of the valve to the cup seat F, the valve shell is placed in a swaging or pressing machine and the wall of the shell is swaged or pressed inwardly from the exterior to form the seat J. While this might be done in such manner as to press the entire stock inwardly, such action would be accompanied by a groove or indentation around the exterior of the part pressed, which would be undesirable. Therefore according to the invention an excess of metal over that which is required for the final diameter is left at the point at which the swaging is to occur, and preferably this excess of metal is pressed inwardly so that in the finished product the exterior diameter of the pressed portion will equal that of the unpressed portion.

In Figs. 1 to 7 are shown the preferred method of operation. Fig. 1 illustrates the solid metal blank from which the valve shell is formed. Fig. 2 shows the next step in which the blank has a body portion Q which is adapted to form the body of the shell and a nipple portion R. In Fig. 3 the nipple is shown as drilled partly at its top to partially form the internal bore and the lower part of the nipple is faced off to form a more or less symmetrical collar S. The bore may be then extended to the cup seat F, as shown in Fig. 4, and preferably the upper tapered part of the seat is faced off by the drill or by a special tool to complete the cup seat. The collar S is also shaped during the operation. The valve shell is then placed in a swaging or pressing machine which preferably comprises four radially arranged jaws which are forced inwardly by a suitable mechanism with the result that the collar S is reduced on its exterior side, the metal flowing or being pressed inwardly, thus restricting the diameter of the bore at such point and forming the seat J. This seat is afterward trued or faced and the exterior of the collar S is turned off slightly to make a smooth exterior and preferably to the extent of conforming its diameter to that of the remainder of the nipple. The shell is then ready for the internal and external threading of the nipple which may be done in the usual way. Figs. 6 and 7 show the completion of the shell.

It will be noted that by the method just described the seat J is formed in the nipple instead of in the body of the casing as has heretofore been the custom, and this requires lengthening the nipple to a slight extent. If it is desired the body of the casing may be reduced accordingly so that the total length of the valve is not changed. It is preferred, however, to retain the standard length of casing and to lengthen the nipple, since this slight change in construction is not detrimental.

According to the invention, however, the valve seat may be formed within the body of the casing, the nipple retaining its original dimensions. This method is illustrated in Figs. 9 and 10. In this construction the blank is passed through a heading operation which produces a protuberance or collar T, which is swaged inwardly in a suitable machine after the bore hereinbefore described is formed, thus pressing in the metal to form the seat J'. The external threading of the valve casing may in this case be reserved until the valve seat is formed, but for the purpose of economy it is preferable to roll the external thread as far as possible prior to the swaging operation, and then to complete the thread by the use of a threading die of hinged construction which may be started on the rolled thread and moved outwardly to the end of the body of the valve casing. In both the methods thus described it will be seen that a swaged seat is constructed after the valve chamber is formed, so that the seat is of less diameter than the valve chamber. It will furthermore be noted that by this process a valve chamber of enlarged size is produced through which the air can easily flow. It will also be observed that the diameters of the parts other than that of the valve chamber are not disturbed, and no dimension which is necessary to complete interchangeability is altered.

What I claim is:—

1. The method of forming a valve casing or the like having a seat and a valve chamber below the seat of greater diameter than the seat which comprises the production of a blank having excess metal opposite the location where the seat is to be formed, and forming the seat by pressing in said excess metal.

2. The method of forming a valve casing or the like having a seat and a valve chamber below the seat of greater diameter than the seat, which comprises forming a blank with a body and a nipple of less diameter than the body and pressing in the metal of the nipple to form a seat.

3. The method of forming a valve casing or the like having a seat and a valve chamber below the seat of greater diameter than the seat, which comprises forming a blank with a body and a nipple, and an enlargement at the nipple opposite the location of the seat and forcing in the nipple at the point of the enlargement to form a seat.

4. The method of forming a valve casing or the like having a seat, a valve chamber and an outer bore portion of greater diameter than said seat on either side thereof, comprising forming said outer bore portion and chamber of substantially their permanent diameters and of a length to contain the valve insides within the casing, and forming said seat by contracting the metal of the casing between said outer bore portion and chamber.

5. The method of forming a valve casing or the like having a seat, a valve chamber and an outer bore portion of greater diameter than said seat on either side thereof, said outer bore portion and chamber being formed by recessing the end of a suitable blank with a forming tool having a diameter substantially equal to the permanent diameter of these parts and of a length to contain the valve insides within the casing, and forming said seat by contracting the metal of the casing between said outer bore portion and chamber.

6. The method of forming a valve casing or the like having a seat, a valve chamber and an outer bore portion of greater diameter than said seat on either side thereof, comprising forming said outer bore portion and chamber of substantially their permanent diameters and of a length to contain the valve insides within the casing, and forming said seat by contracting the metal of the casing between said outer bore portion and chamber and forming a shouldered tubular portion below said chamber portion of less diameter than that of said chamber.

7. The method of forming a valve casing or the like having a seat, a valve chamber and an outer bore portion of greater diameter than said seat on either side thereof, said outer bore portion and chamber being formed by recessing the end of a suitable blank with a forming tool having a diameter substantially equal to the permanent diameter of these parts, said outer bore portion and chamber being of a length to contain the valve insides, and forming said seat by contracting the metal of the casing between said outer bore portion and chamber and forming a shouldered tubular portion below said chamber portion of less diameter than that of said chamber.

In witness whereof I have hereunto signed my name in the presence of two subscribing witnesses.

HENRY P. KRAFT.

Witnesses:
GRACE GUNDERMAN,
FRED WHITE.